May 7, 1968 T. J. HENNIGAN 3,382,107

SEALING DEVICE FOR AN ELECTROCHEMICAL CELL

Filed Oct. 8, 1965

INVENTOR
THOMAS J. HENNIGAN

BY

ATTORNEYS

United States Patent Office 3,382,107

Patented May 7, 1968

3,382,107

SEALING DEVICE FOR AN ELECTRO-CHEMICAL CELL

Thomas J. Hennigan, West Hyattsville, Md., assignor to the United States of America as represented by the Administrator of the National Aeronautics and Space Administration

Filed Oct. 8, 1965, Ser. No. 494,287

7 Claims. (Cl. 136—132)

ABSTRACT OF THE DISCLOSURE

A sealing device for a standard electrochemical cell which enables use of the cell in low pressure environments. The cell, except for its top, is enclosed by a housing with one terminal and an end wall of the cell transfixed in a layer of hardened epoxy resin. Means is provided for permitting external electrical contact with said terminal.

The invention described herein may be manufactured and used by or for the Government of the United States of America for governmental purposes without the payment of any royalties thereon or therefor.

This invention relates in general to improvements in sealing techniques for electrochemical cells, and more particularly to sealing cells with epoxy type resins whereby the cells are suitable for use in high vacuum environments of the type encountered by spacecraft.

The seals used in standard electrochemical cells are made for operation under normal atmospheric pressure, and, therefore, alternative sealing means must be provided if the cells are to be used in environments below normal atmospheric pressure. Numerous seal materials such as ceramic, glass, and epoxy along with welding and brazing techniques, have been proposed for this purpose, such seals acting to replace the conventional cell seals which usually comprise sealing wax, paper or plastic gaskets.

Although such devices have served to alleviate some of the problems of reduced pressure operation they have not proved entirely satisfactory for a number of reasons. Fabrication, when using brittle materials such as ceramics and glass, is quite difficult; and since such seals are generally brazed onto the cell cover and metal terminal, the use of brazing compounds, which are compatible with the case material and metal terminal and unaffected by corrosion due to cell potential and cell environment, is expensive and not always successful. The brittleness of the ceramic or glass also is a deleterious factor when the cell container is stressed due to internal pressures caused when gases are evolved either during cell operation or environmental changes. In addition the welding of a seal to the cell case, due to the application of extreme heat, can readily cause damage to the cell components as well as to the brazed seal.

These problems have resulted in the suggestion to utilize resins such as epoxy to encapsulate the entire cell and thereby seal the structure in a corrosion proof non-brittle seal. However, such resins present a heat transfer problem especially when the cell is discharged or continuously overcharged. Also, complete encapsulation adds unnecessary weight to the cells which becomes a critical problem when the cells are used in spacecraft where weight of the components is carefully controlled and minimized wherever possible.

The general object of this invention is to provide a seal which embraces all the advantages of similarly employed seals and which possesses none of the aforementioned disadvantages.

A more specific object of the present invention is the provision of a simplified seal for an electrochemical cell.

Another specific object is to provide an improved seal for an electrochemical cell which will prevent the leakage of electrolyte or other active materials and yet will not affect the properties of the cell itself.

A still further object of the present invention is to provide a simplified method for making the composite seal of this invention which permits the use of materials that are not subject to breakage during fabrication and use.

Still another object is to provide a novel seal which includes a cylindrical metal housing around an electrochemical cell combined with an epoxy seal to form a composite seal with good mechanical properties and substantial corrosion resistance.

Other objects and the nature and advantages of the present invention will be apparent from the following description taken in conjunction with the accompanying drawings, wherein.

Figure 1:
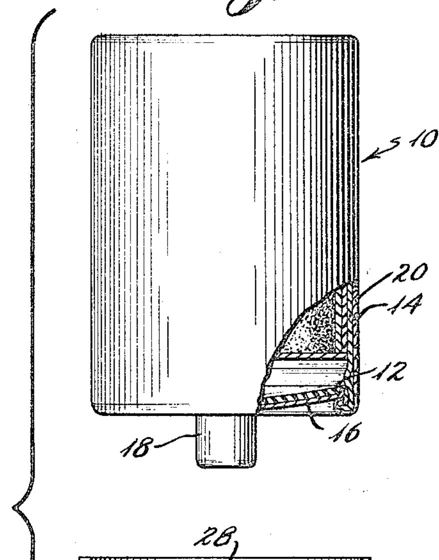
FIG. 1 is a side elevational view partly in section showing a standard electrochemical cell and the sealing means of the invention prior to being joined together.

Referring specifically to the drawings wherein like reference characters designate like or corresponding parts throughout the several views, there is shown in FIG. 1 a standard electrochemical cell which is to be strengthened and sealed by the composite sealing means constructed in accordance with the invention. The electrochemical cell generally designated 10 is a readily available cell of any manufacturer's make which can be of any cross-sectional shape. However, for purposes of illustration a circular cross-sectional cell will be utilized. Generally these cells have a gasket seal 12 to prevent leakage of the electrolyte or active materials. However, it is contemplated that cells with other type internal seals or without any seal can be used. In the cell illustrated a metal casing 14 is the primary supporting element of the cell 10 and serves as the negative terminal. End wall 16 encloses gasket 12 and partially supports terminal 18 which is the positive terminal of this type of electrochemical cell. This terminal is preferably centrally located and extends through end wall 16. The casing 14 may be sheathed in a tube 20 of insulating plastic or paper.

The sealing means of the instant invention generally designated 22 comprises a metallic housing 24 in the form of a cylindrical container having a closed end 26 and an open end 28 for recreation of the cell 10. The housing 24 may also be made of a plastic material such as polystyrene, nylon and Lucite. An opening 30 in the housing 24 provides an escape for the entrapped air as the cell 10 is placed into the housing 24. However, if the assembly is done under vacuum conditions, the air hole 30 is not required.

To provide a permanent mechanical connection between the cell 10 and housing 24 and to act as a further seal, liquid epoxy resin 32 generally used for casting and potting is placed in the closed end 26 of the housing 24. The particular epoxy resin utilized forms no part of the instant invention, such epoxy resins being well known. The epoxy resins are generally combined with curing agents of the type compatible therewith and in some instances curing may be accelerated by heat. The liquid epoxy is also placed on the internal sides of housing 24 to further aid in permanently retaining the cell in housing 24. To enhance sealing between the epoxy and cell 10, the internal surface of housing 24, the external surface of end wall 16, and the external surface of cell 10 may be sandblasted to permit better adherence of the epoxy to these surfaces.

Figure 2:
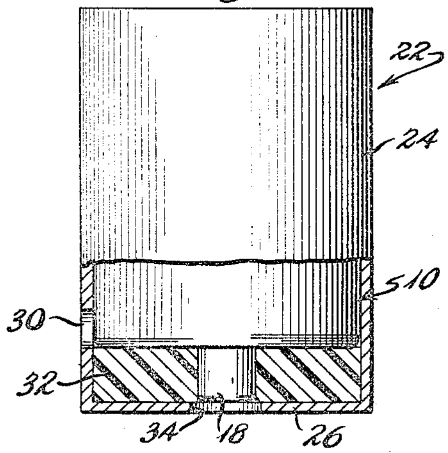
FIG. 2 is a side elevational view partly in section showing the cell and the sealing means joined together with a portion of the sealing means removed to expose the positive electrode of the cell.
Figure 2:
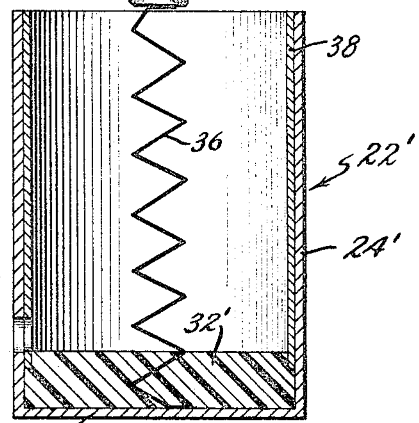

To assemple the composite seal, the cell 10 is inserted into the housing 24 as shown in FIG. 2 until the terminal 18 is against the closed end 26. The liquid epoxy is present in sufficient amounts in housing 24 so that there is no air space between closed end 26 and the cell surface. Upon hardening by curing of the epoxy a center portion 34 is removed by drilling or other machining techniques from end 26 of housing 24 to expose the terminal 18 so that this terminal may be connected to an electrical conductor, not shown. The assembly as shown should be done when the cell is in the discharged state to prevent shorting and damaging the cell during assembly.

As can be seen this construction provides an air-tight permanent seal which provides additional strength. The sealing means is simple to produce and is easily adaptable for any size cell of any cross sectional configuration.

Figure 3:
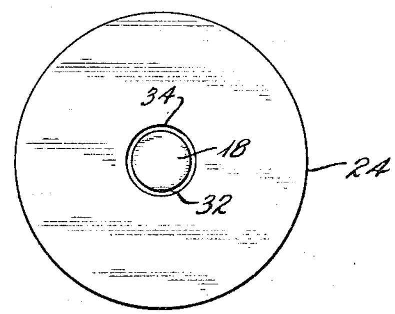
FIG. 3 is a bottom plan view of the seal cell shown in FIG. 2.
Figure 4:
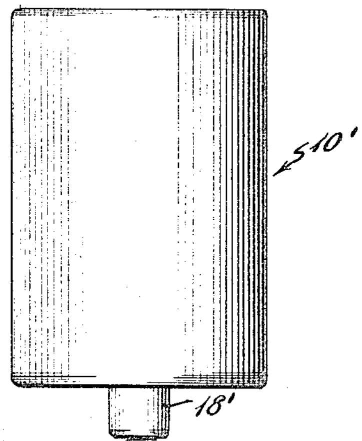
FIG. 4 is a side elevational view partly in section of an alternative embodiment of the cell and seal structures of FIG. 1.

In FIG. 4 there is shown a modification of the sealing means of FIGS. 1–3. In this modification the cell 10' is the same in all respects as cell 10 in the first embodiment except that a strip of flexible conductive material 36 is attached at one end to the terminal 18' and at its other end is connected to the inside of closed end 26' of housing 24'. The strip 36 is shown as formed into an accordion type structure to facilitate folding although a spiral spring-like configuration may be utilized. In all other respects the sealing means 22' is identical to sealing means 22. In assembling this embodiment when cell 10' is slipped into housing 24' the flexible material 36 will fold into the housing 24' and nest below the terminal 18' in the epoxy 32'. By this arrangement the terminal 18' need not touch the closed end 26' of housing 24'. Sufficient liquid epoxy 32' is required to fill the space between cell 10' and closed end 26' of the housing 24' and to insulate the sides of cell 10' from housing 24'. A sleeve 38 of plastic or paper may also be used in the housing 24' to insulate the cell 10' and the housing 24'. Furthermore, with this arrangement, the portion of the electrode 18' extending from the cell 10' need not have the exact length of the depth of the epoxy. This is particularly advantageous for mass production where the depth of the liquid epoxy may vary.

While the invention has been described with central terminal being positive and the casing terminal being negative, depending upon the use of the cell, the polarity of these terminals can be interchanged.

It will be understood that the invention is not to be limited to the exact construction shown and described in the embodiments of this invention but that various changes and modifications may be made without departing from the spirit and scope of the invention as defined in the appended claims.

What is claimed is:

1. An electrochemical cell having a casing, an end wall, a terminal projecting through said end wall, and a sealing means, said sealing means including:

(a) means enclosing said casing and said end wall, said enclosing means including means for making external electrical contact with said terminal; and (b) a sealing material of a curable epoxy resin disposed between and in intimate contact with said cell and said enclosing means.

2. The electrochemical cell of claim 1 wherein said means for making external electrical contact is an opening for said terminal in said enclosing means.

3. The electrochemical cell of claim 2 wherein said enclosing means comprises a housing having a closed end and an open end to receive said cell, said opening being in said closed end adjacent said terminal.

4. The electrochemical cell of claim 1 wherein said means for making external electrical contact includes a flexible conducting member attached at one end to said terminal and at the other end to said enclosing means.

5. The electrochemical cell of claim 4 wherein said enclosing means comprises a housing having a closed end and an open end, said open end to receive said cell, and said other end of said flexible conducting member being attached to said closed end.

6. The electrochemical cell of claim 4 wherein said flexible conducting member is in accordion-like shape to permit ease of flexing.

7. The electrochemical cell of claim 4 wherein said flexible conducting member is in spiral spring-like shape to permit ease of flexing.

References Cited

UNITED STATES PATENTS

| | | | |
|---|---|---|---|
| 1,188,408 | 6/1916 | Burgess | 136—132 X |
| 2,485,397 | 10/1949 | MacFarland | 136—133 |
| 3,081,367 | 3/1963 | Field et al. | 136—133 X |

FOREIGN PATENTS

| | | |
|---|---|---|
| 1,303,501 | 8/1962 | France. |
| 726,413 | 3/1955 | Great Britain. |

WINSTON A. DOUGLAS, *Primary Examiner.*

D. L. WALTON, *Assistant Examiner.*